"
US008850550B2

(12) United States Patent
Dalzell et al.

(10) Patent No.: US 8,850,550 B2
(45) Date of Patent: Sep. 30, 2014

(54) USING CACHED SECURITY TOKENS IN AN ONLINE SERVICE

(75) Inventors: Javier Dalzell, Issaquah, WA (US); Alexander Hopmann, Seattle, WA (US); Huy Nguyen, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 7 days.

(21) Appl. No.: 12/953,379

(22) Filed: Nov. 23, 2010

(65) Prior Publication Data

US 2012/0131660 A1 May 24, 2012

(51) Int. Cl.
*G06F 21/00* (2013.01)
*H04L 9/32* (2006.01)
*G06F 21/33* (2013.01)
*H04L 29/06* (2006.01)

(52) U.S. Cl.
CPC ............ *G06F 21/335* (2013.01); *H04L 9/3213* (2013.01); *H04L 63/168* (2013.01); *H04L 63/0815* (2013.01); *H04L 63/062* (2013.01)
USPC ................................................ 726/9; 726/10

(58) Field of Classification Search
CPC ...... H04W 12/06; H04W 12/08; H04L 63/10; H04L 9/3213; G06F 21/31; G06F 21/62; G06F 21/335; G06Q 20/3674
See application file for complete search history.

(56) References Cited

U.S. PATENT DOCUMENTS

| | | | |
|---|---|---|---|
| 5,553,215 A | 9/1996 | Kaethler | 715/219 |
| 5,835,910 A | 11/1998 | Kavanaugh et al. | |
| 5,857,211 A | 1/1999 | Carper et al. | |
| 5,913,032 A | 6/1999 | Schwartz et al. | 709/213 |
| 6,157,934 A | 12/2000 | Khan et al. | |
| 6,212,382 B1 | 4/2001 | Watson et al. | |
| 6,243,824 B1 | 6/2001 | Kakuta et al. | |
| 6,453,325 B1 | 9/2002 | Cabrera et al. | |

(Continued)

FOREIGN PATENT DOCUMENTS

| | | |
|---|---|---|
| CN | 1989489 | 6/2007 |
| CN | 101162988 A | 4/2008 |

(Continued)

OTHER PUBLICATIONS

U.S. Appl. No. 12/908,681, filed Oct. 20, 2010 entitled ""Placing Objects on Hosts Using Hard and Soft Constraints"".

(Continued)

*Primary Examiner* — Oscar Louie
*Assistant Examiner* — Hao Nguyen
(74) *Attorney, Agent, or Firm* — Thomas Wong; Jim Ross; Micky Minhas

(57) ABSTRACT

A security token service generates a security token for a user that is associated with a client and stores the full security token within a memory. The security token includes an identity claim that represents the identity of the generated security token. Instead of passing the entire security token back to the client, the identity claim is returned to the client. For each request the client makes to the service, the client passes the identity claim in the request instead of the full security token having all of the claims. The identity claim is much smaller then the full security token. When a computing device receives the identity claim within the request from the user, the identity claim is used to access the full security token that is stored in memory.

17 Claims, 6 Drawing Sheets

(56) References Cited

U.S. PATENT DOCUMENTS

| | | | |
|---|---|---|---|
| 6,571,283 B1 | 5/2003 | Smorodinsky | 709/220 |
| 6,578,054 B1 | 6/2003 | Hopmann et al. | 707/625 |
| 6,654,746 B1 | 11/2003 | Wong et al. | |
| 6,675,226 B1 | 1/2004 | Nair et al. | |
| 6,711,593 B1 | 3/2004 | Gordon et al. | 707/615 |
| 6,738,799 B2 | 5/2004 | Dickenson | |
| 6,823,384 B1 | 11/2004 | Wilson et al. | |
| 6,898,727 B1 | 5/2005 | Wang et al. | |
| 6,912,690 B2 | 6/2005 | Bauchot | |
| 6,934,848 B1* | 8/2005 | King et al. | 713/182 |
| 6,983,311 B1 | 1/2006 | Haitsuka et al. | |
| 6,988,241 B1 | 1/2006 | Guttman et al. | |
| 7,000,228 B2 | 2/2006 | Mortazavi | 717/168 |
| 7,047,484 B1 | 5/2006 | Becker et al. | |
| 7,251,776 B2 | 7/2007 | Handsaker et al. | |
| 7,325,156 B1 | 1/2008 | Schloss et al. | |
| 7,360,208 B2 | 4/2008 | Joshi et al. | 717/168 |
| 7,454,659 B1 | 11/2008 | Gaudette et al. | |
| 7,463,648 B1 | 12/2008 | Eppstein et al. | |
| 7,516,367 B1 | 4/2009 | Beltowski et al. | |
| 7,555,751 B1 | 6/2009 | Abbavaram et al. | 717/168 |
| 7,577,661 B2 | 8/2009 | Bankston et al. | 1/1 |
| 7,668,961 B2 | 2/2010 | Lomet | 709/230 |
| 7,680,848 B2 | 3/2010 | Janeditakam | |
| 7,680,933 B2 | 3/2010 | Fatula, Jr. | 709/226 |
| 7,720,820 B2 | 5/2010 | Lomet | 707/682 |
| 7,823,145 B1 | 10/2010 | Le et al. | |
| 8,103,906 B1 | 1/2012 | Alibakhsh et al. | |
| 8,185,897 B2 | 5/2012 | Kushwaha | |
| 8,190,987 B2 | 5/2012 | Campbell et al. | |
| 8,296,267 B2 | 10/2012 | Cahill et al. | |
| 8,307,119 B2 | 11/2012 | Rochelle et al. | |
| 8,386,501 B2 | 2/2013 | Cahill et al. | |
| 8,417,737 B2 | 4/2013 | Hopmann et al. | |
| 8,578,399 B2 | 11/2013 | Khen et al. | |
| 8,751,656 B2 | 6/2014 | Cahill et al. | |
| 2001/0056554 A1 | 12/2001 | Chrabaszcz | 714/13 |
| 2002/0010743 A1 | 1/2002 | Ryan et al. | |
| 2002/0078074 A1 | 6/2002 | Cho et al. | |
| 2002/0078233 A1 | 6/2002 | Biliris et al. | |
| 2002/0129054 A1 | 9/2002 | Ferguson et al. | |
| 2002/0161814 A1 | 10/2002 | Wical | |
| 2002/0162049 A1 | 10/2002 | Takamoto et al. | |
| 2002/0169799 A1 | 11/2002 | Voshell | |
| 2003/0005133 A1 | 1/2003 | Banerjee et al. | |
| 2003/0061365 A1 | 3/2003 | White et al. | 709/229 |
| 2003/0126229 A1 | 7/2003 | Kantor et al. | |
| 2003/0154278 A1 | 8/2003 | Hirschman et al. | |
| 2003/0193558 A1 | 10/2003 | Doss et al. | |
| 2003/0204460 A1 | 10/2003 | Robinson et al. | |
| 2003/0221190 A1 | 11/2003 | Deshpande et al. | |
| 2004/0024881 A1 | 2/2004 | Elving et al. | |
| 2004/0111636 A1 | 6/2004 | Baffes et al. | |
| 2004/0133619 A1 | 7/2004 | Zelig et al. | 709/200 |
| 2004/0143662 A1 | 7/2004 | Poyhonen | |
| 2004/0205765 A1 | 10/2004 | Beringer et al. | |
| 2004/0210623 A1 | 10/2004 | Hydrie et al. | 709/223 |
| 2004/0237045 A1 | 11/2004 | Meltzer | |
| 2005/0044486 A1 | 2/2005 | Kotler et al. | |
| 2005/0050076 A1 | 3/2005 | Tong et al. | |
| 2005/0132382 A1 | 6/2005 | McGuire et al. | |
| 2006/0015806 A1 | 1/2006 | Wallace | |
| 2006/0015932 A1 | 1/2006 | Ballinger et al. | 726/9 |
| 2006/0015933 A1* | 1/2006 | Ballinger et al. | 726/10 |
| 2006/0031268 A1 | 2/2006 | Shutt et al. | |
| 2006/0070020 A1 | 3/2006 | Puttaswamy et al. | |
| 2006/0075076 A1 | 4/2006 | Sinha | |
| 2006/0085785 A1 | 4/2006 | Garrett | 718/1 |
| 2006/0122469 A1 | 6/2006 | Martel | |
| 2006/0123119 A1 | 6/2006 | Hill et al. | 709/227 |
| 2006/0168218 A1 | 7/2006 | Kashyap | 709/225 |
| 2006/0190698 A1 | 8/2006 | Mizuno et al. | 711/170 |
| 2006/0271395 A1 | 11/2006 | Harris et al. | 718/1 |
| 2006/0274695 A1* | 12/2006 | Krishnamurthi et al. | 370/331 |
| 2006/0277224 A1 | 12/2006 | Aftab et al. | |
| 2007/0005769 A1 | 1/2007 | Ammerlaan et al. | 709/226 |
| 2007/0043860 A1 | 2/2007 | Pabari | |
| 2007/0050415 A1 | 3/2007 | Armangau et al. | |
| 2007/0086476 A1 | 4/2007 | Iglesias et al. | |
| 2007/0130566 A1 | 6/2007 | van Rietschote et al. | 718/1 |
| 2007/0169189 A1* | 7/2007 | Crespo et al. | 726/20 |
| 2007/0198554 A1 | 8/2007 | Liu | 1/1 |
| 2007/0204325 A1* | 8/2007 | Cameron et al. | 726/1 |
| 2007/0219956 A1 | 9/2007 | Milton | 1/1 |
| 2007/0220415 A1 | 9/2007 | Cheng et al. | |
| 2007/0260644 A1 | 11/2007 | Ljungqvist et al. | |
| 2007/0261049 A1 | 11/2007 | Bankston et al. | |
| 2007/0271560 A1 | 11/2007 | Wahlert et al. | |
| 2007/0285501 A1 | 12/2007 | Yim | |
| 2008/0077632 A1 | 3/2008 | Tysowski et al. | |
| 2008/0082560 A1 | 4/2008 | Agrawal et al. | |
| 2008/0098046 A1 | 4/2008 | Alpern et al. | 1/1 |
| 2008/0120351 A1* | 5/2008 | Khaladkar et al. | 707/204 |
| 2008/0126428 A1 | 5/2008 | Swamburg | |
| 2008/0147753 A1 | 6/2008 | Chasman et al. | 1/1 |
| 2008/0154918 A1 | 6/2008 | Iwatsu et al. | |
| 2008/0155023 A1 | 6/2008 | Kadashevich | |
| 2008/0189468 A1 | 8/2008 | Schmidt et al. | 711/6 |
| 2008/0243763 A1 | 10/2008 | Bishop et al. | |
| 2008/0243867 A1 | 10/2008 | Janedittakarn et al. | 1/1 |
| 2008/0244184 A1 | 10/2008 | Lewis et al. | 711/130 |
| 2008/0256607 A1 | 10/2008 | Janedittakarn | |
| 2008/0263534 A1 | 10/2008 | Hirsave et al. | |
| 2008/0270459 A1 | 10/2008 | Grewal et al. | 1/1 |
| 2008/0270564 A1 | 10/2008 | Rangegowda et al. | 709/212 |
| 2008/0289020 A1* | 11/2008 | Cameron et al. | 726/9 |
| 2009/0018999 A1 | 1/2009 | Petri | |
| 2009/0083561 A1 | 3/2009 | Kaburlasos et al. | |
| 2009/0100419 A1 | 4/2009 | Childress et al. | |
| 2009/0164621 A1 | 6/2009 | Kothari et al. | 709/224 |
| 2009/0199177 A1 | 8/2009 | Edwards et al. | |
| 2009/0216789 A1 | 8/2009 | Chowdhary et al. | |
| 2009/0216855 A1 | 8/2009 | Lang et al. | |
| 2009/0216975 A1 | 8/2009 | Halperin et al. | |
| 2009/0228589 A1 | 9/2009 | Korupolu | |
| 2009/0228950 A1 | 9/2009 | Reed et al. | 726/1 |
| 2009/0248756 A1 | 10/2009 | Akidau et al. | |
| 2009/0293022 A1 | 11/2009 | Fries | 716/132 |
| 2009/0293056 A1 | 11/2009 | Ferris | |
| 2009/0327139 A1 | 12/2009 | Shah et al. | 705/71 |
| 2010/0011409 A1 | 1/2010 | Hodgkinson et al. | 726/1 |
| 2010/0027552 A1 | 2/2010 | Hill | |
| 2010/0070466 A1 | 3/2010 | Prahlad et al. | |
| 2010/0077165 A1 | 3/2010 | Lu et al. | |
| 2010/0082860 A1 | 4/2010 | Murthy | |
| 2010/0083253 A1 | 4/2010 | Kushwaha | |
| 2010/0095198 A1 | 4/2010 | Bultrowicz et al. | |
| 2010/0106812 A1 | 4/2010 | Bernabeu-Auban et al. | 709/221 |
| 2010/0113159 A1 | 5/2010 | Chapman et al. | |
| 2010/0121902 A1 | 5/2010 | Chandrasekhar et al. | |
| 2010/0125612 A1 | 5/2010 | Amradkar et al. | 707/802 |
| 2010/0145861 A1* | 6/2010 | Law et al. | 705/76 |
| 2010/0146290 A1 | 6/2010 | Bachmann et al. | 713/185 |
| 2010/0162226 A1 | 6/2010 | Borissov | 717/173 |
| 2010/0192143 A1 | 7/2010 | Ingle et al. | 717/172 |
| 2010/0205227 A1 | 8/2010 | Weissman et al. | |
| 2010/0211548 A1 | 8/2010 | Ott et al. | |
| 2010/0211619 A1 | 8/2010 | Weissman et al. | |
| 2010/0251242 A1 | 9/2010 | Sivasubramanian et al. | |
| 2010/0251339 A1 | 9/2010 | McAlister | |
| 2010/0262632 A1 | 10/2010 | Jain et al. | |
| 2010/0275222 A1 | 10/2010 | Wallace | |
| 2010/0287359 A1 | 11/2010 | Norden | |
| 2010/0312810 A1* | 12/2010 | Horton et al. | 707/912 |
| 2011/0071856 A1 | 3/2011 | Nasenbenny et al. | |
| 2011/0138391 A1 | 6/2011 | Cho et al. | |
| 2011/0161964 A1 | 6/2011 | Piazza et al. | |
| 2012/0101983 A1 | 4/2012 | Hopmann et al. | |
| 2012/0101998 A1 | 4/2012 | Cahill et al. | |
| 2012/0102067 A1 | 4/2012 | Cahill et al. | |
| 2012/0102198 A1 | 4/2012 | Cahill et al. | |
| 2012/0102199 A1 | 4/2012 | Hopmann et al. | |
| 2012/0102480 A1 | 4/2012 | Hopmann et al. | |
| 2012/0102506 A1 | 4/2012 | Hopmann et al. | |

(56) References Cited

U.S. PATENT DOCUMENTS

| | | | |
|---|---|---|---|
| 2012/0151378 | A1 | 6/2012 | Parish et al. |
| 2013/0159344 | A1 | 6/2013 | Cahill et al. |
| 2013/0226973 | A1 | 8/2013 | Hopmann et al. |

FOREIGN PATENT DOCUMENTS

| | | |
|---|---|---|
| CN | 101657804 | 2/2010 |
| KR | 10-0980599 | 9/2010 |
| NZ | 20111033894.3 | 6/2014 |
| SG | 189412 | 6/2014 |
| SG | 189417 | 6/2014 |
| WO | 2010-090899 | 8/2010 |

OTHER PUBLICATIONS

U.S. Appl. No. 12/908,639, filed Oct. 20, 2010 entitled "Dynamically Splitting Multi-Tenant Databases".
U.S. Appl. No. 12/908,623, filed Oct. 20, 2010 entitled "High Availability of Machines During Patching".
U.S. Appl. No. 12/908,653, filed Oct. 20, 2010 entitled "Web Service Patterns for Globally Distributed Service Fabric".
U.S. Appl. No. 12/908,590, filed Oct. 20, 2010 entitled "Machine Manager Service Fabric".
U.S. Appl. No. 12/908,703, filed Oct. 20, 2010 entitled "Online Database Availability During Upgrade".
U.S. Appl. No. 12/908,694, filed Oct. 20, 2010 entitled "Managing Networks and Machines for an Online Service".
U.S. Appl. No. 12/908,752, filed Oct. 20, 2010 entitled "Upgrade of Highly Available Farm Server Groups".
U.S. Appl. No. 12/964,633, filed Dec. 9, 2010 entitled "Codeless Sharing of Spreadsheet Objects".
Above the Cloud; "The Azure Fabric Controller"; Published Mar. 23, 2009; http://azure.snagy.name/blog/?p=89; 3 pgs.
"Adopting Server Virtualization for Business Continuity and Disaster Recovery"; CA ARCserve Backup and CA Xosoft Replication and High Availability Software with Hyper-V Technology—A Powerful Combination; Published 2009; 17 pgs.
Allamaraju; "Idempotency Explained"; Published Feb. 21, 2008; 5 pgs.
"BadBlue Excel Web Spreadsheet Collaboration Server 2.72b"; Published Apr. 20, 2010; http://badblue-excel-web-spreadsheet-collaboration-server.badblue.qarchive.org/; 2 pgs.
Chaisiri et al., "Optimal Virtual Machine Placement across Multiple Cloud Providers"; School of Computer Engineering, Nanyang Technological University, Singapore; 2009 IEEE; 8 pgs.
Chronic db; "Live Database Schema Updates—Zero Downtime"; Retrieved Sep. 20, 2010; http://chronicdb.com/benefits_of_chronicdb; 3 pgs.
Crets; "Idempotent Services"; Blog of Guy Crets; Jul. 9, 2008; 1 pg.
Das et al., "ElasTraS: An Elastic, Scalable, and Self Managing Transactional Database for the Cloud"; Department of Computer Science, University of California, Santa Barbara, CA; UCSB Computer Science Technical Report Apr. 2010; 14 pgs.
"Excel Services Overview (SharePoint Server 2010)"; Microsoft Corporation; Published May 12, 2010; http://technet.microsoft.com/en-us/library/ee424405.aspx; 3 pgs.
Exortech; "Zero-Downtime Database Deployment"; Published Feb. 1, 2009; http://exortech.com/blog/2009/02/01weekly-release-blog-11-zero-downtime-database-deployment; 3 pgs.
Forster et al.; "Using SAML Security Tokens with Microsoft Web Services Enhancements"; Published Apr. 29, 2008; http://www.ibm.com/ developerworks/tivoli/library/t-samlwse/index.html; 23 pgs.
"HP Serviceguard Cluster Configuration for HP-UX 11i or Linux Partitioned Systems"; Apr. 2009; 13 pgs.
Hyser et al., "Autonomic Virtual Machine Placement in the Data Center"; HP Laboratories; Feb. 26, 2008; 11 pgs.
"IBM Director v6.2.x"; Retrieved Sep. 20, 2010; http://publib.boulder.ibm.com/infocenter/director/v6r2x/index.jsp?topic=/com.ibm.director.updates.helps.doc/fqm0_t_um_updating_systems.html; 2 pgs.

KaChing Engineering; "No Downtime Database Schema Changes"; Published Aug. 15, 2010; http://eng.kaching.com/2010/08/no-downtime-database-schema-changes.html; 4 pgs.
Kim, "Virtual Machine Placement Optimization"; Carnegie Mellon Engineering, Carnegie Institute of Technology; Retrieved Date—Aug. 26, 2010; 2 pgs.
Kumar; "Sharing and Previewing Google Docs in Socialwok: Google Data SPI"; Published Apr. 9, 2010; http://googleappsdeveloper.blogspot.com/2010/04/ sharing-and-previewing-google-docs-in.html; 6 pgs.
"LinkedCells 1.8 Description"; WareSeeker.com; Published Mar. 16, 2009; http://wareseeker.com/Business-Finance/linkedcells-1.8.zip/1f2ea4b9e; 3 pgs.
Meng et al., "Improving the Scalability of Data Center Networks with Traffic-aware Virtual Machine Placement"; IBM T.J. Watson Research Center; 9 pgs.
"Microsoft High Availability Overview White Paper"; Published Jan. 2008; 19 pgs.
Microsoft; "Virtual Machine Manager"; Retrieved Sep. 21, 2010; http://www.microsoft.com/systemcenter/en/us/virtual-machine-manager.aspx; 2 pgs.
Microsoft Corporation; "Scaling Out SQL Server 2005"; Published Date: Apr. 2006; http://msdn.microsoft.com/en-us/library/aa479364.aspx; 15 pgs.
Microsoft Corporation; "Messaging Patterns in Service-Oriented Architecture, Part 1"; Published Apr. 2004; 10 pgs.
Microsoft TechNet; "Placing Virtual Machines on Hosts"; 2010 Microsoft Corporation; 3 pgs.
Microsoft TechNet; "Configure a Server Farm for Minimal Downtime During Software Updates (Office SharePoint Server 2007)"; Published Sep. 17, 2009; http://technet.microsoft.com/en-us/library/ee514459(office.12).aspx; 26 pgs.
Microsoft TechNet; "Configure Claims-Based Authentication Using Windows Live ID (SharePoint Server 2010)"; Published Sep. 9, 2010; http://technet.microsoft.com/en-us/library/ff973117(printer).aspx; 17 pgs.
MSDN Magazine; "Designing Services for Windows Azure"; Published Jan. 2010; 11 pgs.
"MySQL Cluster Features"; Retrieved Sep. 20, 2010; http://www.mysql.com/products/database/cluster/features.html; 5 pgs.
"The NorduGrid Grid Manager and GridFTP Server"; Published Aug. 10, 2010; http://www.nordugrid.org/documents/GM-pdf; 37 pgs.
Oracle9i Database Migration; "Compatibility and Interoperability"; Retrieved Sep. 20, 2010; http://download.oracle.com/docs/cd/A97630_01/server.920/a96530/migcompa.htm; 42 pgs.
Ranganathan; "Idempotency in Services"; Published Dec. 1, 2009; 21 pgs.
"RightGrid Basic Example"; Retrieved Sep. 24, 2010; http://support.rightscale.com/03-Tutorials/02-AWS/03-Grid_Edition/Basic_RightGrid_Example; 16 pgs.
"SAS Grid Computing"; SAS Institute; Retrieved Sep. 24, 2010; http://www.sas.com/technologies/architecture/grid/index.html; 2 pgs.
"Small to Medium Sized Data Center with Applogic Cloud"; Migrate to Cloud; Published Jul. 22, 2010; http://www.migrate2cloud.com/blog/small-to-medium-sized-date-center-with-applogic-cloud; 4 pgs.
Tarighi et al., "A New Model for Virtual Machine Migration in Virtualized Cluster Server Based on Fuzzy Decision Making"; Journal of Telecommunications, vol. 1, Issue 1, Feb. 2010; 12 pgs.
"Understanding SharePoint 2010 Claims Authentication"; Published May 27, 2010; http://blogs.msdn.com/b/russmax/archive/2010/05/27/ understanding-sharepoint-2010-claims-authentication.aspx; 5 pgs.
"Using Vmware vCenter Update Manager to Keep your vSphere Hosts Up-to-Date with Patching"; Published Feb. 9, 2010; http://www.simple-talk.com/sysadmin/virtualization/using-vmware-vcenter-update-manager-to-keep-your-vsphere-hosts-up-to-date-with-patching/; 10 pgs.
Vmware; "Automating High Availability (HA) Services with Vmware HA"; Copyright 1998-2006; 15 pgs.

(56) References Cited

OTHER PUBLICATIONS

Vmware vSphere; "Vmware vCenter Update Manager"; Retrieved Sep. 14, 2010; 2 pgs.
"Vmware Virtual Appliances"; Published Jan. 8, 2009; http://www.petri.co.il/virtual_vmware_virtual_appliances.htm; 2 pgs.
Wang et al., "A Study and Performance Evaluation of the Multi-Tenant Data Tier Design Patterns for Service Oriented Computing"; IBM China Research Lab, Beijing, China; IEEE Computer Society, 2008 IEEE; 8 pgs.
"XLCubed Web Edition"; Published 2009; http://xlcubed.com/en/web.html; 2 pgs.
"Zones Parallel Patching Feature Now Available"; Published Date Jun. 17, 2009; 1 pg.
Meng et al., "Improving the Scalability of Data Center Networks with Traffic-aware Virtual Machine Placement"; IBM T. J. Watson Research Center; Published May 6, 2010; 9 pgs.
International Search Report dated Mar. 6, 2012 cited in Appln No. PCT/US2011/054566.
International Search Report dated Mar. 6, 2012 cited in Appln No. PCT/US2011/055412.
International Search Report dated Mar. 26, 2012 cited in Appln No. PCT/US2011/053296.
U.S. Office Action dated Apr. 16, 2012 cited in U.S. Appl. No. 12/908,639.
U.S. Office Action dated Apr. 27, 2012 cited in U.S. Appl. No. 12/908,703.
International Search Report dated Apr. 25, 2012 cited in Appln No. PCT/US2011/054516.
International Search Report dated May 1, 2012 cited in Appln No. PCT/US2011/052175.
International Search Report dated May 3, 2012 cited in Appln No. PCT/US2011/053370.
International Search Report dated May 4, 2012 cited in Appln No. PCT/US2011/056594.
International Search Report dated May 17, 2012 cited in Appln No. PCT/US2011/054642.
International Search Report dated Jun. 15, 2012 cited in Appln No. PCT/US2011/062170.
U.S. Office Action dated Nov. 6, 2012 cited in U.S. Appl. No. 12/908,694.
U.S. Office Action dated Nov. 30, 2012 cited in U.S. Appl. No. 12/908,653.
U.S. Appl. No. 13/858,630, filed Apr. 8, 2013 entitled "Online Database Availability During Upgrade".
U.S. Appl. No. 13/657,561, filed Oct. 22, 2012 entitled "Upgrade of Highly Available Farm Server Groups".
Google et al., "Google Docs & Spreadsheet Tour", Feb. 2007, pp. 1-14.
U.S. Office Action dated Mar. 20, 2013 cited in U.S. Appl. No. 12/908,590.
U.S. Office Action dated Mar. 27, 2013 cited in U.S. Appl. No. 12/908,623.
U.S. Office Action dated Mar. 28, 2013 cited in U.S. Appl. No. 12/964,633.
U.S. Office Action dated May 14, 2013 cited in U.S. Appl. No. 12/908,694.
U.S. Office Action dated Aug. 16, 2013 cited in U.S. Appl. No. 12/908,681.
Chinese Office Action dated Jan. 24, 2014 cited in Appln No. 201110340105.8.
U.S. Office Action dated Mar. 12, 2014 cited in U.S. Appl. No. 12/908,653, 19 pgs.
U.S. Office Action dated Mar. 18, 2014 cited in U.S. Appl. No. 12/908,681, 26 pgs.
Chinese Office Action dated Aug. 28, 2013 cited in Appln No. 201110340491.0.
Chinese Office Action dated Oct. 14, 2013 cited in Appln No. 201110339864.2.
Chinese Office Action dated Oct. 31, 2013 cited in Appln No. 201110340455.4.
U.S. Office Action dated Sep. 16, 2013 cited in U.S. Appl. No. 12/908,653.
U.S. Office Action dated Oct. 22, 2013 cited in U.S. Appl. No. 12/908,623.
Google et. al. "What is the correct syntax for import range function for the key attribute?"; http://productforums.google.com/forum/#!topic/docs/aqJAApdcr88; published Jan. 18, 2009; 3 pgs.
Stackexchange.com et. al., "How do I link a cell in Google Spreadsheets to a cell in another document?" See Google Spreadsheets function list "ImportRange" http://webapps.stackexchange.com/questions/786/how-do-i-link-a-cell-in-google-spreadsheets-to-a-cell-in-anotehr-document; published Jul. 1, 2010; 6 pgs.
Chinese Office Action dated Nov. 22, 2013 cited in Appln No. 201110339894.3.
Chinese Office Action dated Dec. 17, 2013 cited in Appln No. 201110430658.2.
Chinese Office Action dated Dec. 19, 2013 cited in Appln No. 201110339912.8.
Chinese Office Action dated Dec. 30, 2013 cited in Appln No. 201110339964.5.
Chinese Office Action dated Jan. 16, 2014 cited in Appln No. 201110339862.3.
U.S. Office Action dated Nov. 7, 2013 cited in U.S. Appl. No. 12/964,633.
U.S. Office Action dated May 7, 2014 in U.S. Appl. No. 12/964,633, 11 pgs.
U.S. Office Action dated May 19, 2014 in U.S. Appl. No. 13/657,561, 59 pgs.
U.S. Office Action dated May 21, 2014 in U.S. Appl. No. 12/908,623, 20 pgs.
Chinese Notice on Grant dated May 26, 2014 in 201110339912.8, 3 pgs.
Chinese Second Office Action dated May 26, 2014 in Appln No, 201110339964.5, 6 pgs.
Chinese Second Office Action dated Jun. 3, 2014 in Appln No. 201110339864.2, 11 pgs.
Chinese Second Office Action dated Jun. 11, 2014 in Appln No. 201110340455.4, 6 pgs.
Chinese Third Office Action dated Jun. 25, 2014 in Appln No. 201110340491.0, 12 pgs.
Chinese Notice on Grant dated Jul. 3, 2014 in 201110340105.8, 4 pgs.
Chinese Second Office Action dated Jul. 11, 2014 in 201110430658.2, 10 pgs.

\* cited by examiner

USING CACHED SECURITY TOKENS IN AN ONLINE SERVICE

BACKGROUND

Many web-based systems use security tokens, such as Security Assertion Markup Language (SAML) tokens, to verify and authenticate users of the system. To obtain a security token, a user provides a credential to a security token service (STS). The STS attempts to authenticate an identity of the user based on the credential. If the STS successfully authenticates the identity of the user, the STS gathers claims from one or more claim providers. The claims can comprise various types of data. For example, the claims can comprise assertions about the identity of the user. After gathering the claims from the claim providers, the STS generates a security token and provides the security token to the user. After receiving the security token, the user provides the security token to the web service for each request it makes to the service. When the web service receives the security token, the web service uses the claims in the security token to determine whether or not the user is authorized to access a resource provided by the web service. These security tokens are expensive to create and can become quite large during an interactive session with the web-based system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A security token service generates a security token for a user that is associated with a client and stores the full security token within a memory, such as a cache. The generated security token includes an identity claim that represents the identity of the generated security token. Instead of passing the entire security token back to the client, the identity claim is returned to the client. The client treats the identity claim as if it were the actual full security token. For each request the client makes to the service, the client passes the identity claim in the request instead of the full security token having all of the claims. The identity claim is much smaller then the full security token. When a computing device receives the identity claim within the request from the user, the identity claim is used to access the full security token that is stored in memory. The accessed security token may then be used within the rest of the service as if it were supplied directly from the client.

DETAILED DESCRIPTION

Figure 1:
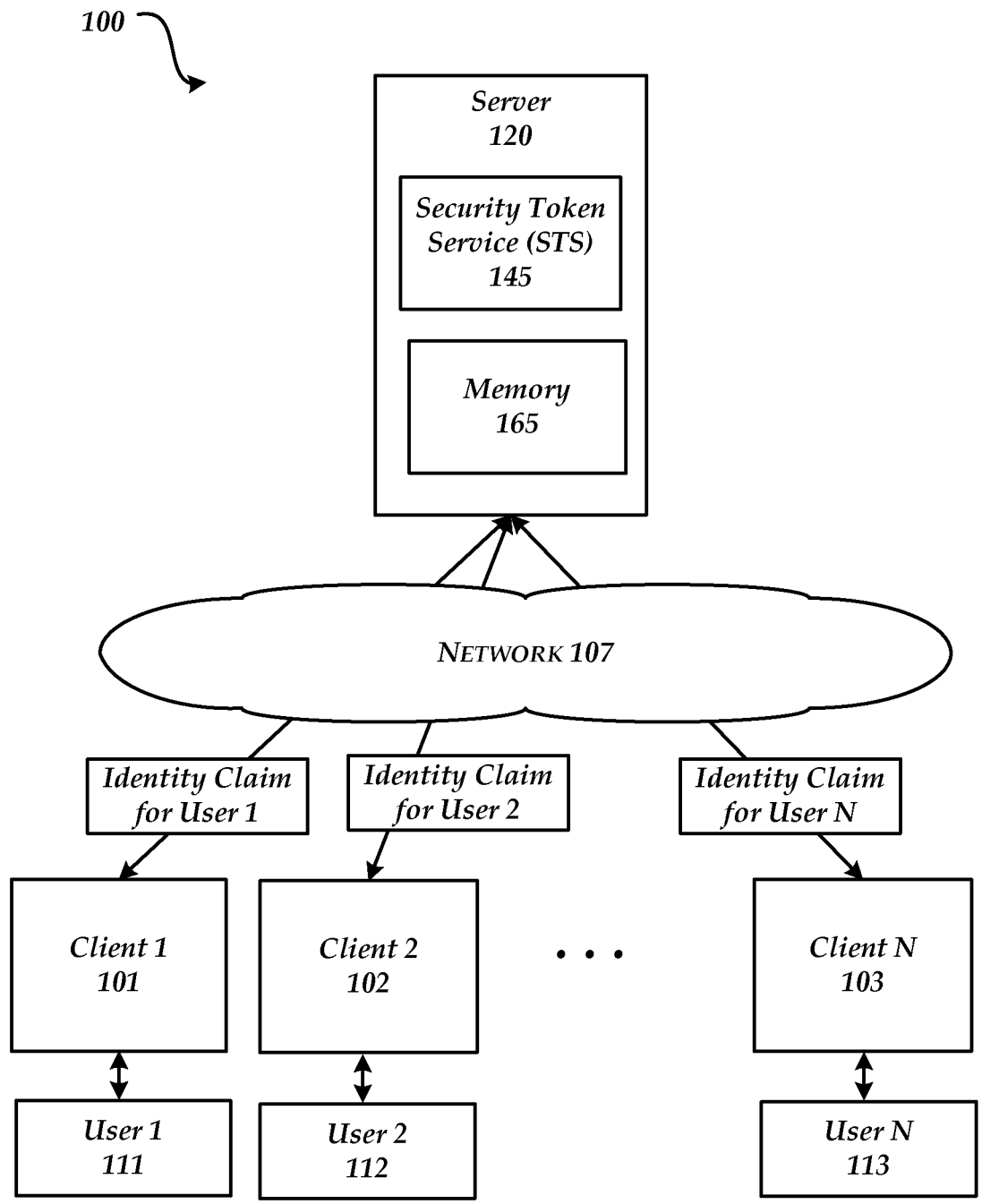
FIG. 1 illustrates a system that uses cached security tokens.

Referring now to the drawings, in which like numerals represent like elements, various embodiment will be described.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

FIG. 1 illustrates a server system that use cached security tokens.

As illustrated, system 100 comprises server 120, network 107, clients 1-N, users 1-N, and identity claims for each of the users 1-N. Server 120 comprises Security Token Service (STS 145) and memory 165.

Security Token Service (STS) 145 is configured to provide a security token service for generating a security token for a user that is associated with a client. For example, STS is configured to generate a different security token for each of the users (User 1-N). After being generated, the entire generated security token is stored within memory 165, such as a cache. The generated security token created by STS 145 includes a special claim called an identity claim that represents the identity of the generated security token. Instead of the server 120 passing the entire security token back to a client, the identity claim is returned to the client. The client treats the identity claim as if it were the actual full security token. For each request the client makes to the service, the client passes the identity claim in the request instead of the full security token having all of the claims. The identity claim is much smaller then the full security token. For example, client 1 (101) passes back the Identity Claim for User 1 with each request, client 2 (102) passes back the Identity Claim for User 2 and client N (103) passes back the Identity Claim for User N, When server 120 receives the identity claim within the request from a user that has had an identity claim created (e.g. one of User 1-N), the identity claim is used by the server to access the full security token that is stored in memory 165. The accessed security token may then be used within the rest of the service as if it were supplied directly from the client. For example, more than one server 120 may be associated with a service. While STS 145 is shown within server 120, the functionality of STS 145 may also be provided on other computing devices within a network. For example, a network may have a one or more dedicated computing device that performs the services of STS 145.

Similarly, each network may store the full security tokens locally for a machine and/or in a global cache for access within the network. Generally, any application that passes a full security token to the client may instead use the functionality of STS 145 such that instead of passing an entire security token back and forth, the identity claim is passed in its place. More detail follows regarding the use of cached security tokens.

Figure 2:
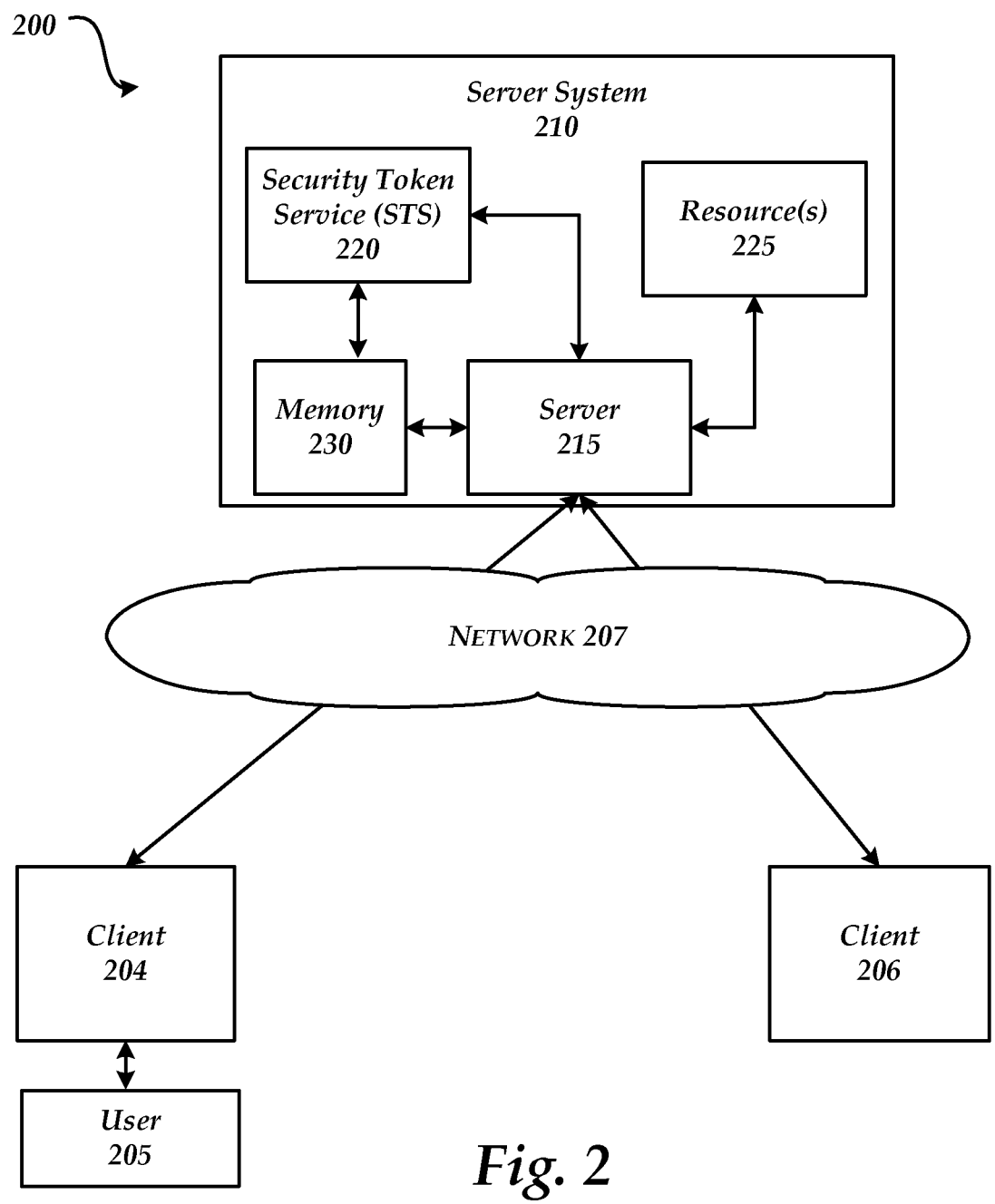
FIG. 2 illustrates an example security token caching system.

FIG. 2 illustrates an example security token caching system 200. As illustrated, system 200 comprises a server system 210. The server system 210 comprises one or more computing devices (e.g. server 215), STS 220, memory 230, resource(s) 225 that is coupled to client devices, such as client 204 and client 206. In some embodiments, the server system 210 comprises one or more computing devices of a type described below with regard to the example of FIG. 6. In various embodiments, various types of entities provide the server system 210. For example, a business organization, a governmental organization, a non-profit organization, or another type of entity can provide the server system 210. The server system may be configured as a cloud based system or it may be configured in other ways.

In some embodiments, client device 204 and client device 206 comprise one or more computing devices of the type described below with regard to the example of FIG. 6. Client device 204 and client device 206 may run web browser applications, workplace productivity applications, or other types of software applications that receive input and display output.

Network 207 enables the client device 204 and the client device 206 to communicate with server system 210. In various embodiments, network 207 can comprise various types of communications networks. For example, network 207 can comprise a wide area network, such as the Internet. In another example, the network 207 can comprise another type of network, such as a local-area network, a public-switched telephone network, or a cellular telephone network. The network 207 can comprise wired and/or wireless communications links.

Server system 210 provides access via network 207 to resources, such as resource(s) 225. In various embodiments, resource(s) 225 can comprise various types of resources. For example, resource 225 can be a word processor document, a spreadsheet document, a slide presentation document, a desktop publishing document, a note-taking document, a web page document, a computer programming source code file, an executable file, an archive file, an email mailbox, or another type of resource.

The server system 210 controls access to resource 225 on the basis of a security token and claims generated by STS 220. For example, client 204 may want to review or edit the content of a resource. In another example, client 206 may want to delete or move a resource. In yet another example, a client may want to execute a resource.

Before a client is able to access a resource from resource(s) 225, the server system 210 authenticates an identity of a user that is associated with a client device. If the server system 210 successfully authenticates the identity of the user using a security token service, such as STS 220, the server system 210 using an STS service generates a security token. Generally, a security token is a data structure comprising one or more claims. For example, the security token can contain a claim indicating that user 205 works in the accounting department of a firm. In another example, the security token can contain a claim indicating that the user 205 is a client of a firm. More than one security token may be generated for a user. For example, a security token may be issued for a user that relates to their job and another security token may be issued for a user that relates to them individually.

According to an embodiment, STS 220 is configured to generate SAML tokens that comprise one or more claims. A claim comprises an assertion by an entity. The claim may relate to anything. For example, a claim may comprise an assertion of a name, a job title, a membership in a group, an age, an address, and the like. A claim may also comprise assertions of things that are not tied to users' identities. For instance, a claim can comprise an assertion regarding financial data (e.g., the current price of stock XYZ is $5.52).

When user 205 connects to server system 210 the user may provide identifying information, such as submitting credentials, an identifier, a security token, and the like. STS 220 receives this identifying information and creates a security token, such as a SAML token that includes one or more claims. The security token may be generated according to different standards, such as SAML, SAML 1.0, 1.1, 2.0, or other similar standards. One of the claims that STS 220 creates is an identity claim that is used to represent the identity of the full security token that is generated by STS 220. The identity claim uniquely identifies the full security token and may be created cryptographically such that the identity claim may be verified. The identity claim is much smaller as compared to the full security token. For example, an identity claim may be 100-400 bytes whereas a full security token may be over 100K of data.

According to embodiments, the format of the identity claim follows the following formats: (1) UserIdentity+","+ExpirationTime+","+Base64(RSA-SHA2-256 signature of (UserIdentity+","+ExpirationTime)); or (2) UserIdentity+", "+ExpirationTime+","+Base64(RSA-SHA2-256 signature of (UserIdentity+","+ExpirationTime)),AudienceURI. The UserIdentity identifies the user. The ExpirationTime identifies a time period the identity claim is valid. According to an embodiment, the expiration time is specified in. The AudienceURI is a Uniform Resource Identifier (URI) path that is used to establish the context of the tenancy for this value. Leaving the Audience URI out of the "identity claim" enables the same value to be used across multiple AudienceURIs. The key used for the RSA-SHA2-256 encryption is the private key of the token issuing authority, such as STS 220. It can be validated by itself as well as the service process (which has access to its public key but not its private key). Other formats may also be used.

The full security token that is generated by STS 220 is stored in a memory, such as 230. STS 220, or some other computing device within server system 210, may store the generated security token in memory 230. The memory may be configured in different manners. For example, the memory 230 may be a cache, a distributed caching service (e.g. MICROSOFT's Windows Server AppFabric Caching, Memcached, and the like), RAM, a data store and the like. According to an embodiment, the claims of the security token are stored in memory 230 in a binary format. Storing the claims in binary format saves the extra step of having to parse XML that is related to the token that would be performed if the full security token was passed in by the client.

After STS 220 generates the full security token including the identity claim, STS 220 returns the identity claim to the client device that is associated with the user (e.g. client 204 for user 205). The client device uses the identity claim just as they would use the full security token. The user may not even be aware that they did not receive the full security token. Since the identity claim is much smaller then the full security token, there is much less data to pass back and forth between server system 210 and the clients for each request.

After the client device 204 receives the identity claim that identifies the security token that is stored in memory 230, the client device 204 sends the identity claim back to the server system 210 along with every normal request to that server. The access request comprises a request to access the resource 225. When the server system 210 receives the identity claim and the access request, the server system 210 determines whether the user 205 is authorized to access the resource 225. The server accesses the received identify claim and looks up the full security token in memory 230. Additional context information, such as tenancy information, may be used in looking up the full security token such that the correct claims are returned. For instance, in a multi-tenancy server system, the same user might have access to multiple tenancies using the same identity, but has a different set of full-claims that represent their permissions to that specific tenancy.

If the full token is retrieved from the cache, the security token is used transparently by the rest of the system as if the full token were supplied directly from the client. According to another embodiment, the identity claim or the full token may be sent to the other servers in the system when they have access to memory 230.

If the full token is not found in the cache, the server process (e.g. server 215) makes a call to the security token service 220. Instead of passing a normal identity, the server process passes the special "identity claim" as if it were a password. STS 220 validates this "password" cryptographically as originating from itself and as not expired and if valid, does the normal process of issuing a new security token that is placed in memory 230 for future requests.

The claims in the full security token are used to determine if the user satisfies a security policy for the resource 112. For example, a security policy for the resource 225 can specify that only members of a certain group are allowed to access the resource 225. In this example, the server system 210 can determine that the user 205 is authorized to access the resource 225 when the security token includes a claim that indicates that the user 205 is a member of the certain group.

When an identity claim is no longer valid (e.g. timed out, user permissions changed, and the like), the associated security token may be removed from any memory in which it is stored. For example, when the security token is stored in a distributed cache, the security token may be removed from a single memory. When the security token is stored on many different machines, each machine may remove the security token that is associated with the security token. Since the token is no longer in the cache, the next time it is needed it will be reissued, causing the underlying values (such as user permissions) to be recalculated.

Figure 3:
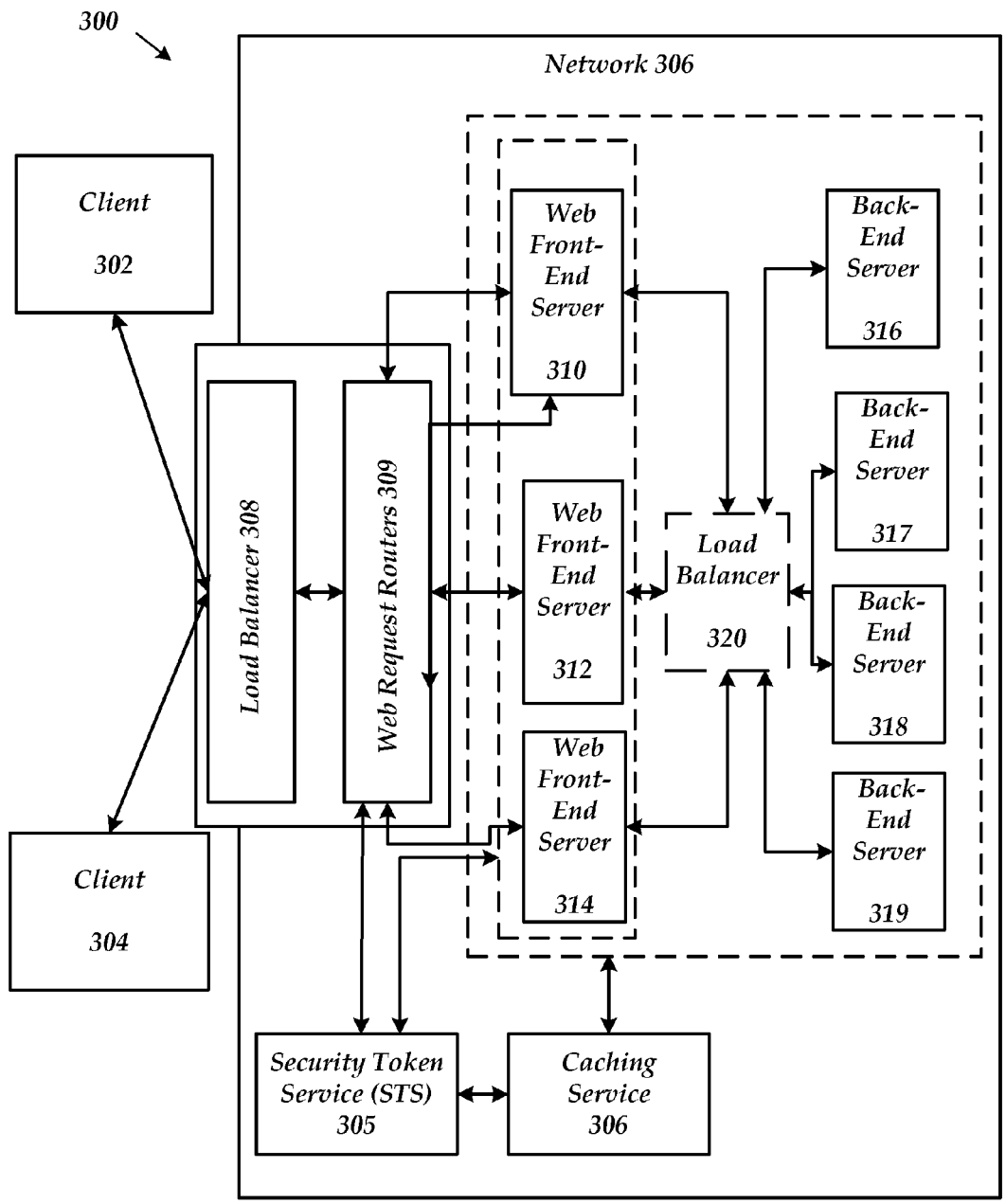
FIG. 3 shows an example system for a network including front-end and back-end servers for an online service that caches security tokens.

FIG. 3 shows an example system 300 for a network including front-end and back-end servers for an online service that caches security tokens. The example system 300 includes clients 302 and 304, network 306, load balancer 308, web request routers 309, security token service (STS) 305, caching service 306, WFE servers 310, 312, 314, back-end servers 316-319, and optional load balancer 320. Greater or fewer clients, WFEs, back-end servers, load balancers and networks can be used. Additionally, some of the functionality provided by the components in system 300 may be performed by other components. For example, some load balancing may be performed in the WFEs.

In example embodiments, clients 302 and 304 are computing devices, such as desktop computers, laptop computers, terminal computers, personal data assistants, or cellular telephone devices. Clients 302 and 304 can include input/output devices, a central processing unit ("CPU"), a data storage device, and a network device. In the present application, the terms client and client computer are used interchangeably.

WFEs 310, 312 and 314 are accessible to clients 302 and 304 via load balancer 308 and web request routers 309 through network 306. As discussed, the servers may be configured in farms. Back-end server 316 is accessible to WFEs 310, 312 and 314. Load balancer 308 is a dedicated network device and/or one or more server computers. Load balancer 308, web request routers 309, load balancer 320, WFEs 310, 312 and 314 and back-end server 316 can include input/output devices, a central processing unit ("CPU"), a data storage device, and a network device. In example embodiments, network 306 is the Internet and clients 302 and 304 can access WFEs 310, 312 and 314 and resources connected to WFEs 310, 312 and 314 remotely.

In an example embodiment, system 300 is an online, browser-based cloud system. An example of cloud based system is Microsoft Sharepoint® Online from Microsoft Corporation of Redmond, Wash. In system 300, one or more of the back-end servers 316-319 are SQL servers, for example SQL Server from Microsoft Corporation of Redmond, Wash.

WFEs 310, 312 and 314 provide an interface between clients 302 and 304 and back-end servers 316-319. The load balancers 308, 320 direct requests from clients 302 and 304 to web request routers and from WFEs to back-end servers 316-319. Web request routers 309 direct requests to WFEs 310, 312 and 314 and use factors such as WFE utilization, the number of connections to a WFE and overall WFE performance to determine which WFE server receives a client request. Similarly, the load balancer 320 uses factors such as back-end server utilization, the number of connections to a server and overall performance to determine which back-end server receives a request. Web request routers 309 may be used to offload some of the processing from load balancer 308. For example, load balancer 308 may operate at a lower TCP/IP layer (e.g. layer 4) such that it may handle more requests. Web request routers 309 provide a scalable request router that may operate at a higher TCP/IP layer (e.g. layer 7). The web request routers may use application specific logic for routing the requests. For example, the requests may be routed based on a document identifier and/or user information that is included within the received request.

An example of a client request may be to access a document stored on one of the back-end servers, to edit a document stored on a back-end server (e.g. 316-319) or to store a document on back-end server. When load balancer 308 receives a client request over network 306, load balancer 308 directs the request to one of the available web request routers 309. The web request router 309 determines which one of WFE server 310, 312 and 314 receives the client request. Similarly, load balancer 320 determines which one of the back-end servers 316-319 receive a request from the WFE servers. The back-end servers may be configured to store data for one or more tenants (i.e. customer).

STS 305 is configured to generate identity claims and security tokens. Generally, STS 305 generates a full security token and an identity claim that is used to identify the full security token that is stored in a memory, such as caching service 306. When a user requests access to a resource, their identity may be verified before allowing access to the resource. Instead of passing the entire security token back and forth between users and the online system, the identity claim is passed back and forth in place of the full security token. While STS 305 is shown separate from the WFEs and the other servers, the functionality of STS 305 may be included in one or more of the servers. For example, each WFE may include an STS. Similarly, one or more servers may also store their own cache of full security tokens that relate to the users they provide services for. In the embodiment, illustrated, the servers providing the resources to clients 302 and 304 use a distributed caching service 306 that allows them to access the full security token using the provided identity claim. According to another embodiment, the full security token may be obtained when a request is initially received by load balancer 308 and then the full security token may be transferred to other servers in network 306.

Figure 4:
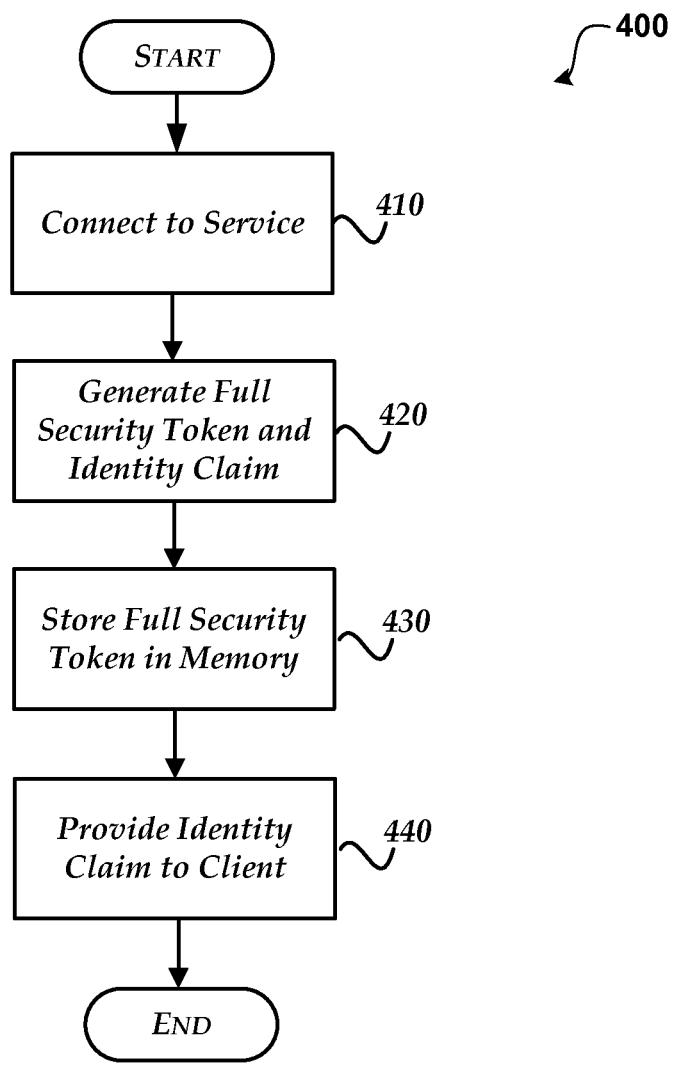
FIG. 4 shows a process for using cached security tokens in an online system.

FIG. 4 shows a process for using cached security tokens in an online system.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process 400 flows to operation 410, where a user connects to a service, such an online cloud based service. The service authenticates an identity of a user by receiving identifying credentials such as an ID, password, security token and the like.

Moving to operation 420, a full security token is generated for the user that includes an identity claim that identifies the full security token. For example, the security token may be a SAML token. The identity claim uniquely identifies the full security token and may be created cryptographically such that the identity claim may be verified. The identity claim is much smaller as compared to the full security token. For example, an identity claim may be specified in bytes whereas a full security token and claims may be specified in hundreds of Kbytes.

Flowing to operation 430, the full security token is stored in a memory. The memory may be local to the computing device and/or globally stored such that the full security token is available to one or more computing devices providing the online service. For example, the memory may be a distributed caching service, such as MICROSOFT's Windows Server AppFabric Caching, Memcached, and the like. Each server handling resources may also include functionality for caching the full security token and/or generating the full security token and the identity claim.

Transitioning to operation 440, the identity claim is provided to the client instead of providing the full security token to the client. According to an embodiment, the identity claim is returned in a cookie in the same manner as a SAML token is provided to a client.

The process then moves to an end block and returns to processing other actions.

Figure 5:
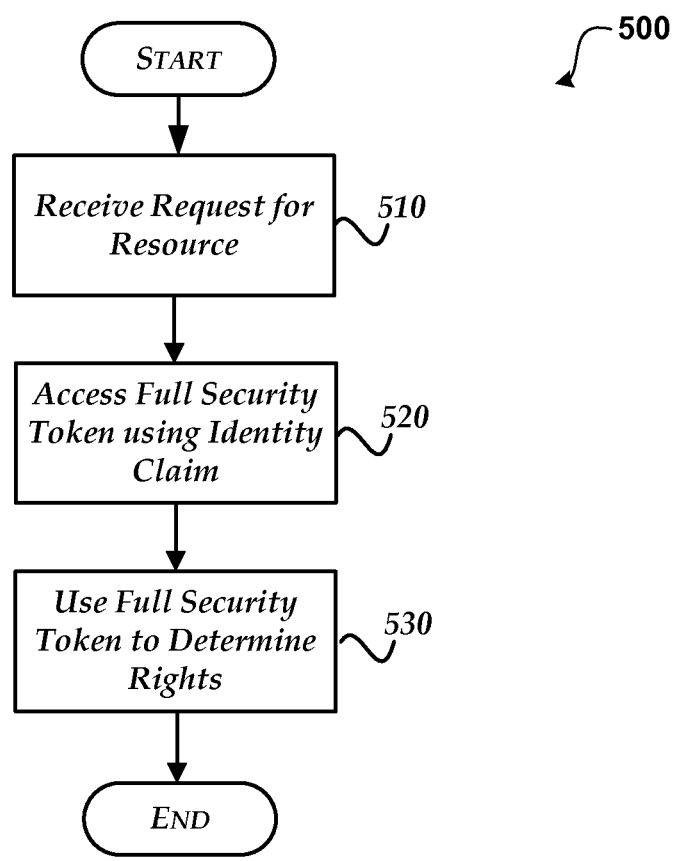
FIG. 5 shows a process for using an identity claim to access a full security token.

FIG. 5 shows a process for using an identity claim to access a full security token.

After a start operation, the process flows to operation 510 where a request is received. The request may be for a resource that are stored on one or more of the machines in the network. A computing device that receives the request may obtain the identity claim from the request. According to another embodiment, the request may be forwarded to another computing device that obtains the identity claim from the request.

Flowing to operation 520, the full security token is obtained from a memory using the received identity claim. Generally, the identity claim is used to look up the full security token in a memory that is associated with the computing device receiving the request. As discussed, the memory may be local to the computing device and/or at some other location within the network. For example, the full security token may be obtained from a distributed caching service that is utilized by an online service.

Flowing to operation 530, the full security token is used in determining the rights of the user with regard to the requested resource. The full security token may be passed to other computing devices to obtain one or more resources just as if the full token was passed from the client requesting the resource. According to another embodiment, the identity claim is passed to other computing devices that then use the identity claim to access the full security token. The process then moves to an end block and returns to processing other actions.

Figure 6:
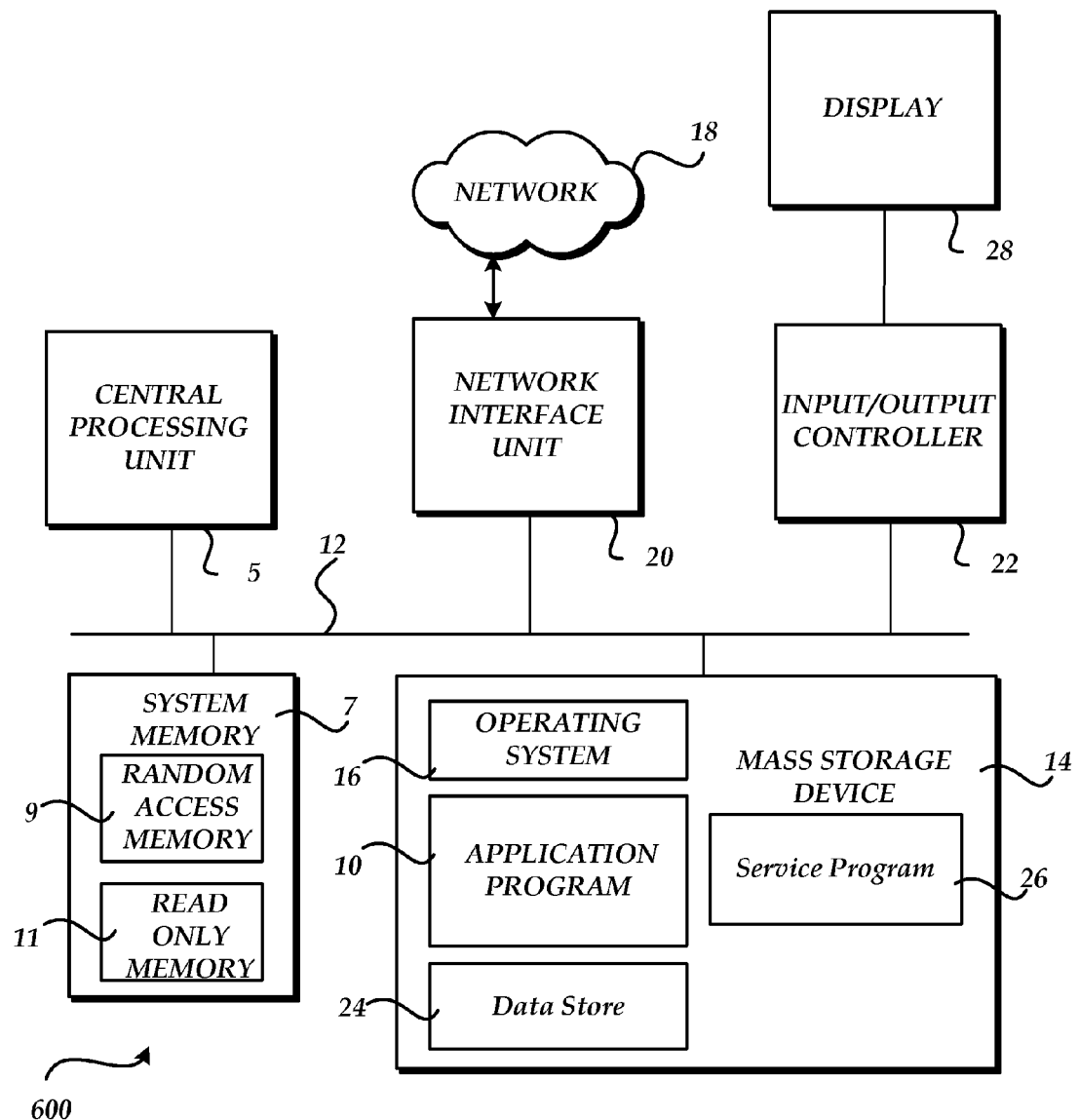
FIG. 6 shows an illustrative computer architecture.

Referring now to FIG. 6, an illustrative computer architecture for a computer 600 utilized in the various embodiments will be described. The computer architecture shown in FIG. 6 may be configured as a server, a desktop or mobile computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 500 further includes a mass storage device 14 for storing an operating system 16, application programs 10, data store 24, files, and a service program 26 relating to execution of and interaction with the an online system.

The mass storage device 14 is connected to the CPU 5 through a mass storage controller (not shown) connected to the bus 12. The mass storage device 14 and its associated computer-readable media provide non-volatile storage for the computer 500. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 600.

According to various embodiments, computer 600 may operate in a networked environment using logical connections to remote computers through a network 18, such as the Internet. The computer 600 may connect to the network 18 through a network interface unit 20 connected to the bus 12. The network connection may be wireless and/or wired. The network interface unit 20 may also be utilized to connect to other types of networks and remote computer systems. The computer 600 may also include an input/output controller 22 for receiving and processing input from a number of other devices, including a keyboard, mouse, or electronic stylus (not shown in FIG. 6). Similarly, an input/output controller 22 may provide output to a display screen 28, a printer, or other type of output device.

As mentioned briefly above, a number of program modules and data files may be stored in the mass storage device 14 and RAM 9 of the computer 600, including an operating system 16 suitable for controlling the operation of a networked computer, such as the WINDOWS® operating systems from MICROSOFT® CORPORATION of Redmond, Wash. The mass storage device 14 and RAM 9 may also store one or more program modules. In particular, the mass storage device 14 and the RAM 9 may store one or more application programs, such as services program 26, that perform tasks relating to a system.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for using cached security tokens in an online service, comprising:
   receiving a request over a network from a client for a resource of the online service, wherein the request comprises an identity claim that uniquely identifies an externally stored first security token, and wherein the externally stored first security token is different from the identity claim and is stored in memory in a location that is separate from the request;
   determining that the first security token is no longer valid;
   revoking the identity claim by deleting the first security token from the memory;
   attempting to access with the identity claim, the externally stored first security token;
   when the first security token is not found at the online service:
      sending the identity claim to a token issuing authority to generate a second security token; and
      determining, with the second security token, when to provide the resource to the client.

2. The method of claim 1, further comprising generating a security token for the client and storing the generated security token in the memory; wherein the generated security token comprises claims, wherein at least one of the claims generated is an identity claim that is used in identifying the generated security token.

3. The method of claim 2, wherein storing the generated security token in the memory comprises storing the claims of the security token in binary form in the memory.

4. The method of claim 1, wherein the memory is at least one of: a cache and a distributed cache.

5. The method of claim 1, wherein the security token is a Security Assertion Markup Language (SAML) token.

6. The method of claim 1, wherein the identity claim comprises UserIdentity+","+ExpirationTime+","+Base64(RSA-SHA2-256 signature of (UserIdentity+","+ExpirationTime)).

7. The method of claim 1, wherein the identity claim comprises UserIdentity+","+ExpirationTime+","+Base64(RSA-SHA2-256 signature of (UserIdentity+","+ExpirationTime)),AudienceURI.

8. A computer-readable storage medium, excluding a signal, having computer-executable instructions for using cached security tokens for users, comprising:
   receiving a request from a client for a resource that is located within a network; wherein the request comprises an identity claim that uniquely identifies an externally stored first Security Assertion Markup Language (SAML) token, and wherein the first SAML token is stored in memory within the network and is separate from the request;
   determining that the first SAML token is no longer valid;
   revoking the identity claim by deleting the first SAML token from the memory;
   attempting to access, with the identity claim, the externally stored first SAML token;
   when the first SAML token is not found on the network:
      sending the identity claim to a token issuing authority to generate a second SAML token; and
      determining, with the second SAML token, when to provide the resource to the client.

9. The computer-readable storage medium of claim 8, further comprising generating a SAML token for the client and storing the generated SAML token in the memory; wherein the generated SAML token comprises claims, wherein at least one of the claims generated is an identity claim that is used in identifying the generated SAML token.

10. The computer-readable storage medium of claim 9, wherein storing the generated SAML token in the memory comprises storing the claims of the SAML token in binary form in the memory.

11. The computer-readable storage medium of claim 8, wherein the memory is at least one of: a cache and a distributed cache that is within the network.

12. The computer-readable storage medium of claim 8, wherein the identity claim comprises one of: UserIdentity+","+ExpirationTime+","+Base64(RSA-SHA2-256 signature of (UserIdentity+","+ExpirationTime)) and UserIdentity+","+ExpirationTime+","+Base64(RSA-SHA2-256 signature of (UserIdentity+","+ExpirationTime)),AudienceURI.

13. A system for routing requests in an online service, comprising:
   a processor and a computer-readable medium, excluding a signal;
   an operating environment stored on the computer-readable medium and executing on the processor;
   a security token service that provides a security token service that is used to generate security tokens for users in a network, wherein the generated security tokens comprise claims, wherein at least one of the claims generated is an identity claim that is used in identifying the generated security token; wherein the identity claim is returned to the client instead of returning the generated security token; wherein at least one computing device in the online service is configured to perform actions, comprising:
   receiving a request from a client for a resource that is located within the network; wherein the request comprises an identity claim that uniquely identifies an externally stored first security token from the request, wherein the externally stored first security token is stored in memory within the network;
   determining that the first security token is no longer valid;
   revoking the identity claim by deleting the first security token from the memory;
   attempting to access with the identity claim, the externally stored first security token;
   when the first security token is not found on the network:
      sending the identity claim to a token issuing authority to generate a second security token; and
      determining, with the second security token, when to provide the resource to the client.

14. The system of claim 13, wherein accessing the security token using the identity claim that is contained within the received request comprises determining a tenancy that is associated with the client and accessing the security token that is associated with the determined tenancy for the client.

15. The system of claim 13, wherein the identity claim comprises one of: UserIdentity+","+ExpirationTime+","+Base64(RSA-SHA2-256 signature of (UserIdentity+","+ExpirationTime)) and UserIdentity+","+ExpirationTime+","+Base64(RSA-SHA2-256 signature of (UserIdentity+","+ExpirationTime)),AudienceURI.

16. The method of claim 1, wherein the identity claim is smaller in size than the security token uniquely identified by the identity claim.

17. The method of claim 8, wherein the identity claim is smaller in size than the security token uniquely identified by the identity claim.

* * * * *